(12) United States Patent
Ussery et al.

(10) Patent No.: US 8,010,542 B2
(45) Date of Patent: Aug. 30, 2011

(54) APPARATUS AND METHOD FOR BUILDING CONJOINED COMPUTER SYSTEMS

(75) Inventors: Troy Alan Ussery, Allen, TX (US); William J. Dunlow, Rowlett, TX (US)

(73) Assignee: B2I Technologies, Inc., Richardson, TX (US)

( * ) Notice: Subject to any disclaimer, the term of this patent is extended or adjusted under 35 U.S.C. 154(b) by 263 days.

(21) Appl. No.: 10/938,040

(22) Filed: Sep. 10, 2004

(65) Prior Publication Data
US 2006/0059158 A1    Mar. 16, 2006

(51) Int. Cl.
*G06F 17/30* (2006.01)
(52) U.S. Cl. .................... 707/758; 707/716; 707/802
(58) Field of Classification Search .............. 707/10, 707/716, 758, 802; 705/35
See application file for complete search history.

(56) References Cited

U.S. PATENT DOCUMENTS

| | | | | |
|---|---|---|---|---|
| 5,473,143 A | * | 12/1995 | Vak et al. ...................... 235/380 |
| 5,815,665 A | * | 9/1998 | Teper et al. .................. 709/229 |
| 5,862,325 A | * | 1/1999 | Reed et al. .................... 709/201 |
| 5,930,764 A | * | 7/1999 | Melchione et al. .......... 705/7.29 |
| 6,345,288 B1 | * | 2/2002 | Reed et al. .................... 709/201 |
| 6,581,035 B1 | * | 6/2003 | Madan et al. ................. 704/273 |
| 6,606,708 B1 | * | 8/2003 | Devine et al. ..................... 726/8 |
| 2002/0143660 A1 | * | 10/2002 | Himmel et al. ................ 705/27 |
| 2002/0169835 A1 | * | 11/2002 | Paul et al. ..................... 709/206 |
| 2002/0184507 A1 | * | 12/2002 | Makower et al. ............. 713/182 |
| 2003/0065956 A1 | * | 4/2003 | Belapurkar et al. ......... 713/202 |
| 2003/0200265 A1 | * | 10/2003 | Henry ........................... 709/206 |
| 2004/0225887 A1 | * | 11/2004 | O'Neil et al. ................. 713/193 |

OTHER PUBLICATIONS

Kormann et al. "Risks of the Passport single signon protocol." May 23, 2000. pp. 1-4.*
Oppliger, Rolf. "Microsfot .Net Passport: A Security Analysis." Jun. 2003. pp. 29-34.*

* cited by examiner

*Primary Examiner* — Shahid A Alam

(57) ABSTRACT

A method includes receiving, at a communication manager, information for a user from a plurality of computer systems. The user is capable of accessing each of the plurality of computer systems, and the communication manager is separate from the plurality of computer systems. The method also includes detecting the user accessing one of the plurality of computer systems. In addition, the method includes providing the information from the plurality of computer systems to the user after detecting the user accessing one of the plurality of computer systems.

26 Claims, 6 Drawing Sheets

220

LAST NAME: [  ]   FIRST NAME: [  ]

MIDDLE INITIAL: [ ]   BIRTHDATE: [  ]

HOME MAILING ADDRESS: [  ]

CITY: [  ]   STATE: [ ]   ZIP: [ ]

HOME TELEPHONE NUMBER: [  ] 222

224 — [SUBMIT]   [CANCEL] — 226

EMAIL ADDRESS: MYEMAILADDRESS@ABC.COM — 242

ENTER VALIDATION CODE: [  ] — 244

246 — [SUBMIT]   [CANCEL] — 248

NAME: JOHN Q. PUBLIC

BIRTHDATE: 01/01/1951

HOME MAILING ADDRESS:
    1 MAIN STREET, ALEXANDRIA, VA 22313

HOME TELEPHONE NUMBER: 123-456-7890

EMAIL ADDRESS: MYEMAILADDRESS@ABC.COM

262 — [EDIT]   [CANCEL] — 264

*FIG. 2D*

APPARATUS AND METHOD FOR BUILDING CONJOINED COMPUTER SYSTEMS

TECHNICAL FIELD

This disclosure is generally directed to information management systems and more specifically to an apparatus and method for building conjoined computer systems.

BACKGROUND

Corporations, businesses, and other organizations typically provide various types of information to the general public or to a particular group of people. For example, public corporations often provide investment information to current or potential investors. Oftentimes, these people request information from multiple organizations, and many organizations attempt to track the people that request information. As an example, an organization typically requires that a person requesting information first register with the organization's computer system and establish a user account before the requested information is provided. Registration often involves collecting contact or other information (generally referred to as "account information"), such as a person's name, address, telephone number, electronic mail ("email") address, and password.

Conventional computer systems used by the organizations often suffer from one or more problems. For example, a user typically must register with each organization's computer system before receiving information from that organization. This forces the user to register multiple times before receiving desired information. Also, each organization typically communicates with the user through email, and these communications are only available to the user when the user accesses his or her email account.

SUMMARY

This disclosure provides an apparatus and method for building conjoined computer systems.

In one aspect, a method includes receiving, at a communication manager, information for a user from a plurality of computer systems. The user is capable of accessing each of the plurality of computer systems, and the communication manager is separate from the plurality of computer systems. The method also includes detecting the user accessing one of the plurality of computer systems. In addition, the method includes providing the information from the plurality of computer systems to the user after detecting the user accessing one of the plurality of computer systems.

In another aspect, a method includes detecting at one of a plurality of computer systems a user accessing the computer system. The user is capable of accessing each of the plurality of computer systems. The method also includes providing an indication to a communication manager identifying the user. The communication manager is separate from the plurality of computer systems. The method further includes receiving from the communication manager information from the plurality of computer systems for the user. In addition, the method includes providing the information from the plurality of computer systems to the user.

In yet another aspect, a computer program product is tangibly embodied on a computer readable medium and operable to be executed by a processor. The computer readable medium can include a computer readable storage medium. The computer program product comprises computer readable program code for receiving, at a communication manager that manages information for a plurality of users, information from at least one of a plurality of computer systems for delivery to a user within the plurality of users, wherein the user is authorized to access each of the plurality of computer systems. The computer program product also comprises computer readable program code for detecting that the user is accessing one of the computer systems or the communication manager. The computer program product also comprises computer readable program code for providing the information to the user, in response to detecting the user accessing one of the computer systems or the communication manager. The information provided to the user may include information from one of the plurality of computer systems other than the accessed computer system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A through 2D illustrate example interfaces used to collect account information according to one embodiment of this disclosure;

DETAILED DESCRIPTION OF EXAMPLE EMBODIMENTS

Figure 1:
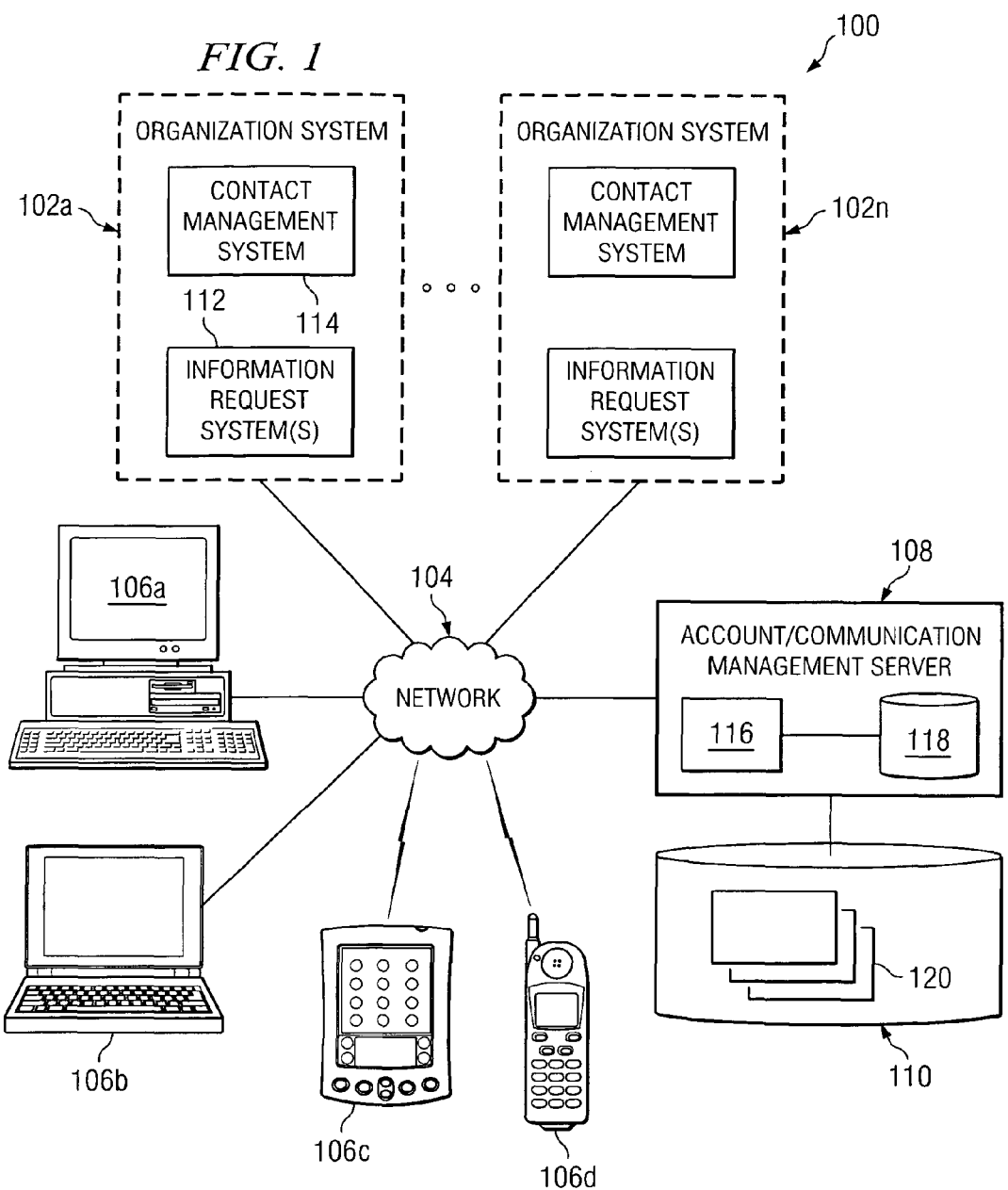
FIG. 1 illustrates an example system for managing account information according to one embodiment of this disclosure.

FIG. 1 illustrates an example system 100 for managing account information according to one embodiment of this disclosure. In this example embodiment, the system 100 includes one or more organization computer systems 102*a*-102*n*, a network 104, one or more end user devices 106*a*-106*d*, an account/communication management server 108, and a database 110. The system 100 shown in FIG. 1 is for illustration only. Other embodiments of the system 100 may be used without departing from the scope of this disclosure.

In the illustrated example, the organization computer systems 102*a*-102*n* are coupled to the network 104. In this document, the term "couple" and its derivatives refer to any direct or indirect communication between two or more elements, whether or not those elements are in physical contact with one another. The organization computer systems 102*a*-102*n* are associated with one or more organizations. The organizations could represent, for example, businesses, corporations, non-profit groups, or any other or additional types of organizations. The organization computer systems 102*a*-102*n* are capable of performing a wide variety of functions. For example, the organization computer systems 102*a*-102*n* may be capable of providing requested information to one or more users of the end user devices 106*a*-106*d*. Also, the organization computer systems 102a-102n may be capable of performing functions requested by the users of the end user devices 106a-106d.

In this example, each of the organization computer systems 102a-102n includes one or more information request systems 112 and a contact management system 114. In this document, the term "each" means every one of at least a subset of the identified items. Each of the information request systems 112 represents any suitable system that is capable of providing requested information to one or more users of the end user devices 106a-106d. For example, the information request systems 112 may represent systems for providing various documents to the users upon request. The information request systems 112 may also represent systems for providing electronic mail ("email") messages, surveys, presentations, or Internet broadcasts (referred to as "webcasts") to the users.

The contact management system 114 represents a system used by an organization to manage the organization's contact information. For example, organizations typically wish to maintain contact information for a wide variety of people, such as customers, business partners, vendors, suppliers, or investors. The contact management system 114 stores information about these and/or other people. As an example, the contact management system 114 could store information such as the people's names, addresses, telephone numbers, and email addresses.

The network 104 is coupled to the organization computer systems 102a-102n and the account/communication management server 108. The network 104 may also be coupled to various ones of the end user devices 106a-106d. The network 104 facilitates communication between components of the system 100. For example, the network 104 may communicate Internet Protocol ("IP") packets, frame relay frames, Asynchronous Transfer Mode ("ATM") cells, or other suitable information between network addresses. The network 104 may include one or more local area networks ("LANs"), metropolitan area networks ("MANs"), wide area networks ("WANs"), all or a portion of a global network such as the Internet, or any other communication system or systems at one or more locations. The network 104 may also operate according to any appropriate type of protocol or protocols, such as Ethernet, IP, X.25, frame relay, or any other protocol.

The end user devices 106a-106d communicate with the network 104. The end user devices 106a-106d represent computing or communication devices used by users to access the organization computer systems 102a-102n or the account/communication management server 108. For example, the users may use the end user devices 106a-106d to request information from one or more of the organization computer systems 102a-102n. The end user devices 106a-106d represent any suitable devices capable of communicating with the organization computer systems 102a-102n and/or the account/communication management server 108 (either directly or indirectly, such as through the network 104). In this example, the end user devices 106a-106d include a desktop computer, a laptop computer, a personal digital assistant, and a mobile telephone. These examples of the end user devices 106a-106d are for illustration only. Any other or additional types of end user devices may be used in the system 100 of FIG. 1. Also, the end user devices 106a-106d may communicate with the network 104 over any suitable connections, including wireline and wireless connections.

The information request systems 112 in different organization computer systems 102a-102n may be unable to interact directly with one another and exchange information about the users of the end user devices 106a-106d. As a result, users of the end user devices 106a-106d may be required to provide the same account information to multiple organization computer systems 102a-102n. Also, the information request systems 112 may be unable to interact with the contact management systems 114 in the organization computer systems 102a-102n. Further, the information request systems 112 might otherwise include multiple accounts for the same user of a user device 106a-106d. In addition, the information request systems 112 and contact management systems 114 may be unable to allow the users of the end user devices 106a-106d to manage and control their account information. These and/or other problems may make it difficult for organizations to effectively manage their account information.

One or more of these problems may be reduced or eliminated by the account/communication management server 108. The account/communication management server 108 is coupled to the network 104 and the database 110. In general, the account/communication management server 108 provides a centralized management platform for managing contact and other account information associated with users of at least some of the end user devices 106a-106d. For example, the account/communication management server 108 may maintain accounts for users of the user devices 106a-106d, where the accounts contain or are otherwise associated with up-to-date contact information for the users.

The account/communication management server 108 includes any hardware, software, firmware, or combination thereof for managing account information. In the illustrated example, the account/communication management server 108 includes one or more processors 116 and one or more memories 118 containing data and instructions used by the one or more processors 116. Also, the account/communication management server 108 could use any suitable mechanism for collecting account information, such as a web-based interface.

The database 110 is coupled to the account/communication management server 108. The database 110 stores information used by the account/communication management server 108 to provide account management. For example, the database 110 may store unique records 120, which represent user accounts maintained by the account/communication management server 108. Ideally, each of the unique records 120 contains account information for a different user of the end user devices 106a-106d. As particular examples, each of the unique records 120 may include a name, home address, home telephone number, work address, work telephone number, mobile telephone number, and/or email address for a user of the end user devices 106a-106d. The database 110 includes any hardware, software, firmware, or combination thereof for storing and facilitating retrieval of information. The database 110 may also use any of a variety of data structures, arrangements, and compilations to store and facilitate retrieval of information.

The database 110 may use any suitable identifier to uniquely associate a particular user with a unique record 120. For example, in some embodiments, the database 110 uses email addresses as the unique identifier. If a user has provided only one email address to the organization computer systems 102a-102n and/or the account/communication management server 108, that user will be associated with one unique record 120. In other embodiments, different information (such as social security numbers) may be used as the unique identifier.

The account/communication management server 108 may support various functions to collect, maintain, and use the account information associated with the users of the end user devices 106a-106d and that is stored in the database 110. The following description describes several examples of the functions that may be performed or supported by the account/ communication management server 108. Other or additional functions could be performed or supported by the account/communication management server 108.

In some embodiments, the account/communication management server 108 receives and stores account information in the database 110. For example, the account/communication management server 108 may allow a user of the end user devices 106a-106d to register and provide account information directly to the account/communication management server 108. The account/communication management server 108 may also receive account information for a user indirectly, such as receiving the account information through one or more of the organization computer systems 102a-102n. The collection of information indirectly through the organization computer systems 102a-102n may be done transparently to the user. As a particular example, an information request system 112 in the organization computer systems 102a-102n could act as a portal for the account/communication management server 108. A form used by the account/communication management server 108 to collect account information may be presented by the information request system 112 to the user. Information entered into the form may be provided to the account/communication management server 108 through the information request system 112. Moreover, the organization itself could provide account information to the account/communication management server 108. This provides greater flexibility in how account information may be collected by the account/communication management server 108.

As another example, account information for a particular user may be collected all at once or over time. A user who wishes to provide all account information at one time may do so, while account information about a different user may be collected gradually. For example, a user who accesses one of the organization computer systems 102a-102n may initially provide only his or her email address. When the user accesses one of the organization computer systems 102a-102n a second time, the user may provide his or her name and home zip code. A third time, the user may provide his or her complete mailing address. In this way, the user may not be required to provide a large amount of account information all at once. This may increase the likelihood that more complete account information about the user can be collected.

As yet another example, when a user attempts to access the organization computer systems 102a-102n, the organization computer systems 102a-102n may determine whether the user has registered with the account/communication management server 108 (whether account information for that user is being maintained by the account/communication management server 108). If so, the organization computer systems 102a-102n may provide access to requested information or functions without requiring the user to register with the organization computer systems 102a-102n. This may allow the user to gain access to requested information or functions more easily.

Moreover, organizations can establish different levels of access for different information or functions provided by the information request systems 112. Some information or functions may be provided only if a user has registered and provided all required account information to the account/communication management server 108, while other information or functions may be provided without restriction. Also, the account/communication management server 108 could support an "invitation" feature whereby only particular users are invited to gain access to particular information or functions of the organization's computer system. If an uninvited user attempts to access the information or function, the organization could use the account/communication management server 108 to identify the user and decide whether to approve access for the uninvited user.

Beyond that, the account/communication management server 108 may allow the users themselves to access, edit, and control their own account information. This may allow, for example, a user to edit his or her home mailing address and telephone number. Also, the contact management systems 114 in the organization computer systems 102a-102n may reference or otherwise retrieve account information for particular users from the database 110 through the account/communication management server 108. This may allow the organization computer systems 102a-102n to have access to more up-to-date contact or other account information about the users.

In addition, the account/communication management server 108 may store or otherwise provide access to information relevant to the users and provide a conduit for communications between one or multiple organizations and the users. For example, the account/communication management server 108 may store in database 110 or otherwise provide access to news items, file downloads, updated websites, or any other or additional information. The various information may be provided by one or more of the organizations or identified by the user. In some embodiments, multiple organizations may provide information for presentation to a user, and the account/communication management server 108 provides the information to the user whenever the user accesses any one of the organization computer systems 102a-102n. In this way, the user need not access a particular organization's computer system to gain access to the information from that organization. Once a user has viewed the information or taken some other action related to the information, the information may be removed from the user's display.

In particular embodiments, the organization computer systems 102a-102n provide information for or execute functions associated with investor relations. Also, the users of the end user devices 106a-106d may represent actual or potential investors. A subset of these users could represent "accredited investors," or investors who have satisfied Securities and Exchange Commission accreditation requirements.

These users may request investment information from the information request systems 112 in the organization computer systems 102a-102n. As particular examples, users could request information such as documents filed with the Securities and Exchange Commission, press releases issued by the organization, or any other or additional information that may be of interest to investors. The actual or potential investors may also request that the information request systems 112 execute particular functions for the investors. As an example, an investor may wish to join an email list that allows the investor to receive email alerts when particular events associated with the organization occur. An information request system 112 may then add the investor's email address to the email list. This may allow, for example, the investor to be notified when relevant investment information is released by the organization. Further, organizations could contact accredited investors to attempt to raise capital or perform other activities involving only a subset of the users. Moreover, users could participate in various surveys and other activities related to investments, and a user visiting an organization's computer system could view survey and other information related to that organization. In addition, the two-way communication feature could allow one of the organizations to provide an investor with an offer to purchase stock, a proxy solicitation, or an offer to participate in a direct reinvestment program. The investor could receive that information whenever the investor accesses any of the organization computer systems 102a-102n.

A computer program embodied on a computer readable medium and operable to be executed by a processor comprises computer readable program code for receiving, at a communication manager, information for a user from a plurality of computer systems, the user capable of accessing each of the plurality of computer systems, the communication manager separate from the plurality of computer systems. The computer program also comprises computer readable program code for detecting the user accessing one of the plurality of computer systems, and providing the information from the plurality of computer systems to the user after detecting the user accessing one of the plurality of computer systems.

Although FIG. 1 illustrates one example of a system 100 for managing account information, various changes may be made to FIG. 1. For example, the system 100 may include any number of organization computer systems 102, networks 104, end user devices 106, servers 108, and databases 110. Also, although the description above has described the use of a server 108 in the system 100, the functionality of the server 108 could be implemented on other computing device(s), such as a desktop computer or a laptop computer. Further, each of the organization computer systems 102a-102n may or may not include both an information request system 112 and a contact management system 114. In addition, while FIG. 1 illustrates that one database 110 is coupled directly to the account/communication management server 108, any number of databases 110 may reside at any location or locations accessible by the server 108.

FIGS. 2A through 2D illustrate example interfaces used to collect account information according to one embodiment of this disclosure. In particular, FIGS. 2A through 2D illustrate example interfaces used by the account/communication management server 108 of FIG. 1 to collect account information. The interfaces shown in FIGS. 2A through 2D are for illustration only. Other mechanisms may be used to collect account information without departing from the scope of this disclosure. Also, the interfaces may be described as being used when a user attempts to access information or functions through an information request system 112. The same or similar interfaces could be used when the user attempts to register directly with the account/communication management server 108.

As described above, the information request systems 112 may support various levels of access to information and functions. For example, the information request systems 112 could provide access to particular information or functions for all users, for users who have registered and provided account information, or for users who have registered and provided account information and verified their email addresses.

Figure 2A:
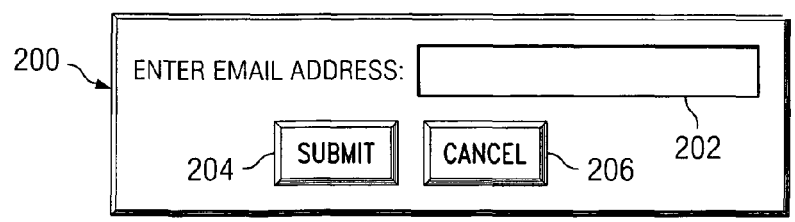

Assuming that some form of registration is needed to access requested information or functions, the account/communication management server 108 provides an interface 200 shown in FIG. 2A to the user. The interface 200 is provided to the user through the information request system 112, which acts as a portal for the account/communication management server 108. In this example, the interface 200 includes an entry box 202 requesting that the user provide his or her email address. The interface 200 also includes a submit button 204 and a cancel button 206. In this example embodiment, the account/communication management server 108 uses email addresses as a unique identifier. In other words, each unique email address is associated with a different unique record 120. In other embodiments, different unique identifiers could be used and requested using the interface 200.

When some form of registration is needed to access information or functions in the organization computer systems 102a-102n, the user provides an email address in the entry box 202 and selects the submit button 204. The account/communication management server 108 uses the provided email address to attempt to locate a unique record 120 with a matching email address. If a unique record 120 with a matching email address is located, this indicates that the user has already established an account (registered) with the account/communication management server 108. The account/communication management server 108 informs the information request system 112, and the information request system 112 may provide access to the requested information or function.

If a unique record 120 with a matching email address is not located, the account/communication management server 108 provides the user with an interface 220, which is shown in FIG. 2B. The interface 220 includes multiple entry boxes 222, a submit button 224, and a cancel button 224. The entry boxes 222 are used to collect different account information from the user, allowing the user to register with the account/communication management server 108. In this example, the entry boxes 222 are used to collect the user's name, birthdate, home address, and home telephone number. This represents only some examples of the account information that may be collected using the interface 220. Other or additional account information may be collected by the account/communication management server 108.

The account/communication management server 108 stores the information provided by the user through the interface 220 in a new unique record 120, creating a new account for and registering that user. The new unique record 120 is associated with the email address entered in the entry box 202 of FIG. 2A. Additional information may also be stored in the new unique record 120. For example, the account/communication management server 108 could perform a mail exchange ("MX") record lookup using the email address provided by the user in the entry box 202 of FIG. 2A. An MX record lookup is used to identify the email servers used by a specified email address, which allows an email address to be verified. The results of the MX record lookup, such as the identity of the email servers, could be stored in the new unique record 120 associated with an email address.

If the MX record lookup confirms that an email address is valid and the user has provided the required account information, the user may be able to gain access to the requested information or function of the organization computer systems 102a-102n if no additional registration is required. However, an organization may require additional registration, such as requiring validation of the email address associated with the new unique record 120.

To validate an email address, the account/communication management server 108 may communicate an email message to the email address, where the email message contains a validation code. The validation code could represent, for example, a numeric or alphanumeric code. The email message may also contain a uniform resource locator ("URL") or other mechanism that directs the user to an interface 240 shown in FIG. 2C.

The interface 240 shown in FIG. 2C identifies an email address 242, which represents the email address provided using the interface 200 of FIG. 2A. The interface 240 also includes a validation code entry box 244, a submit button 246, and a cancel button 248. The entry box 244 allows the user to enter the validation code contained in the validation email message sent to the user's email address. If the validation code entered in the entry box 244 by the user matches the validation code contained in the validation email message, the account/communication management server 108 validates the user's email address. In this way, the account/communication management server 108 verifies whether a user attempting to access information or functions in the organization computer systems 102a-102n has provided a valid email address used by that particular user.

The use of validation email messages containing validation codes represents one possible mechanism for validating email addresses. Other mechanisms could also be used by the account/communication management server 108 to validate email addresses. For example, the account/communication management server 108 could send an email message to the email address provided by a user, where the email message contains a URL that uniquely corresponds to that email address. If the user later uses the URL, the account/communication management server 108 may validate the user's email address without requiring the user to enter a validation code.

After the account/communication management server 108 has stored at least some account information for a particular user, the user may view his or her account information using an interface 260, which is shown in FIG. 2D. The interface 260 identifies the account information stored in the unique record 120 associated with the user's email address. The interface 260 also includes an edit button 262 and a cancel button 264. The edit button 262 allows the user to add, change, or delete at least some of the account information contained in the unique record 120. For example, the user may be able to change the user's home mailing address or telephone number. As another example, the user may be able to provide a new email address, and the account/communication management server 108 may attempt to validate the new email address.

In some embodiments, before the user is allowed to edit information in a unique record 120, the user may be required to provide a password associated with the unique record 120. The password could be established at any suitable time and in any suitable manner. For example, the password may be generated and provided by the account/communication management server 108 after the user enters information using the interface 220 or the interface 240. The password could also be generated by the account/communication management server 108 and included in the validation email message sent to the user's email address. Further, the password could be selected or modified by the user during registration or at any other suitable time.

Although FIGS. 2A through 2D illustrate examples of the interfaces used to collect account information, various changes may be made to FIGS. 2A through 2D. For example, each of the interfaces 200-260 may include any other or additional contents in any suitable arrangement. Also, multiple interfaces 220 may be used to collect different pieces of account information from a user at different times. In addition, while the account/communication management server 108 has been described as using email messages to communicate with a user who is using the interfaces 200-260, other means of communication could be utilized by the account/communication management server 108.

Figure 3:
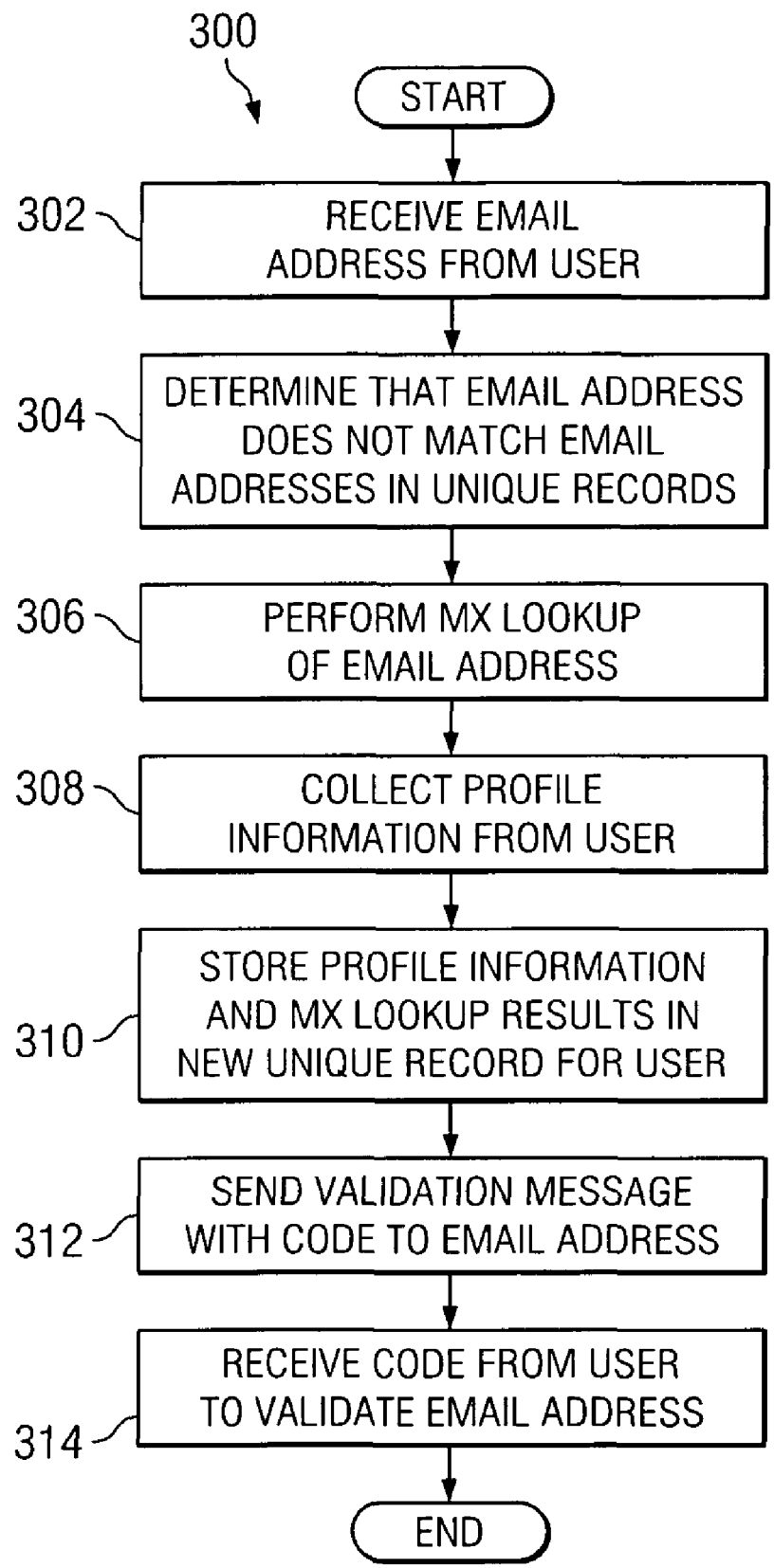
FIG. 3 illustrates an example method for collecting account information for a user according to one embodiment of this disclosure.

FIG. 3 illustrates an example method 300 for collecting account information for a user according to one embodiment of this disclosure. For ease of explanation, the method 300 is described with respect to the account/communication management server 108 operating in the system 100 of FIG. 1. The method 300 could be used by any other suitable device and in any other suitable system.

The account/communication management server 108 receives an identification of a user's email address at step 302. This may include, for example, the account/communication management server 108 receiving the email address directly from a user who is accessing the account/communication management server 108. This may also include the account/communication management server 108 receiving the email address from one of the organization computer systems 102a-102n that the user is attempting to access.

The account/communication management server 108 determines if the email address fails to match email addresses contained in all existing unique records 120 at step 304. In this example embodiment, the account/communication management server 108 uses the email address as the unique identifier for the records 120. In other embodiments, other identifiers (such as social security numbers) may be received at step 302 and used at step 304. If the email address matches an existing unique record 120, a new unique record 120 is not created, and the method 300 ends. At this point, the user has already registered, and a corresponding account maintained by the account/communication management server 108 exists.

When the account/communication management server 108 determines that no unique record 120 matches the received email address, the account/communication management server 108 performs an MX record lookup of the received email address at step 306. This may include, for example, the account/communication management server 108 identifying the email server or servers that receive incoming email messages for the received email address.

The account/communication management server 108 collects account information from the user at step 308. This may include, for example, the account/communication management server 108 (either directly or indirectly through one of the organization computer systems 102a-102n) providing the user with a form to be completed by the user. The account information could include the user's name, address(es), telephone number(s), birthdate, and password.

The account/communication management server 108 generates a new unique record 120 and stores the collected account information and MX record lookup results in the new record 120 at step 310. This may include, for example, the account/communication management server 108 storing the account information received from the user and the user's email address in the new record 120. This may also include the account/communication management server 108 storing the identity of the email server(s) that were located during the MX record lookup.

The account/communication management server 108 sends a validation message containing a validation code to the user's email address at step 312. This may include, for example, the account/communication management server 108 generating an email message that includes a numeric or alphanumeric code uniquely associated with the email address. The email message may also include a URL or other mechanism directing the user to an interface, such as the interface 240 of FIG. 2C, where the code can be provided to the account/communication management server 108.

The account/communication management server 108 receives the code from the user, thereby validating the user's email address, at step 314. This may include, for example, the account/communication management server 108 receiving the code contained in the validation email message from the user using an interface, such as the interface 240 of FIG. 2C.

At various points throughout the method 300, the account information may be retrieved by one or more of the organization computer systems 102a-102n. For example, the information may be retrieved after the information is stored at step 310 or after the email address is validated at step 314.

Although FIG. 3 illustrates one example of a method 300 for collecting account information for a user, various changes may be made to FIG. 3. For example, step 308 may be repeated multiple times in the method 300, where different pieces of account information are collected each time. Also, step 312 may be repeated (such as at a specified interval of time) until the email address is validated by the user. In addition, mechanisms other than a validation code may be used to validate an email address.

Figure 4A:
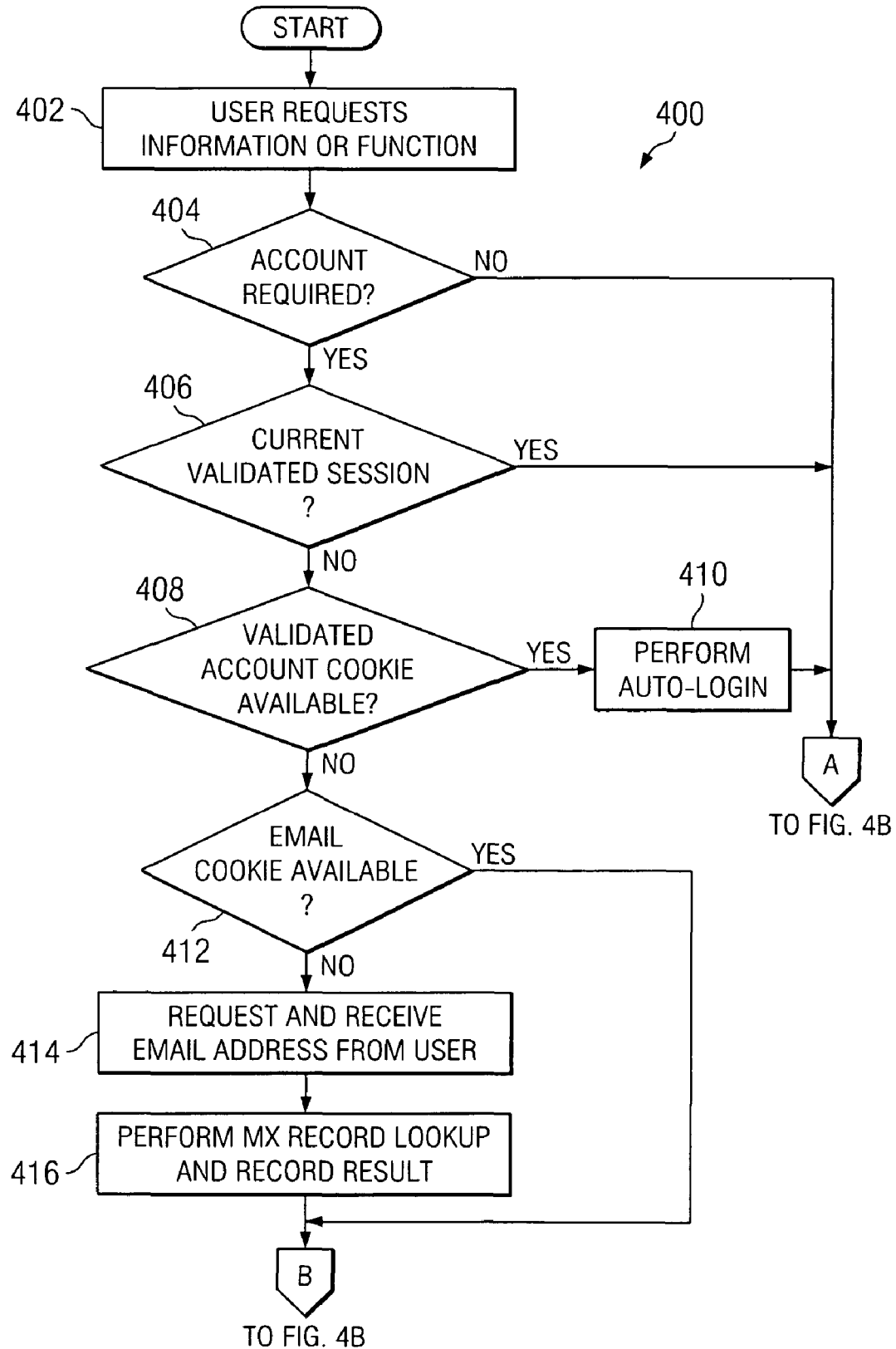
FIGS. 4A and 4B illustrate an example method for providing requested information or functions to users according to one embodiment of this disclosure.
Figure 4B:
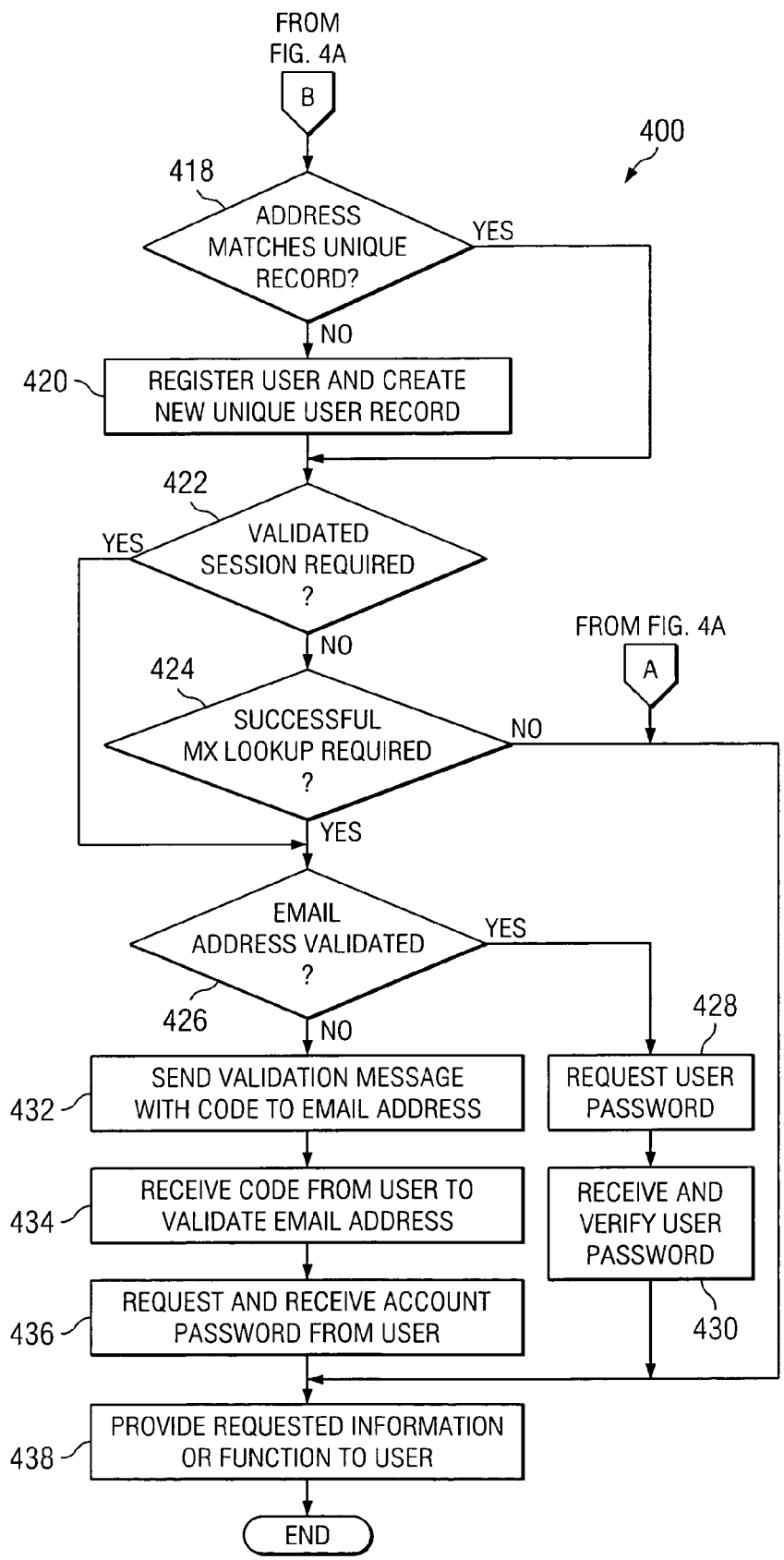

FIGS. 4A and 4B illustrate an example method 400 for providing requested information or functions to users according to one embodiment of this disclosure. For ease of explanation, the method 400 is described with respect to the system 100 of FIG. 1. The method 400 could be used in any other suitable system.

One of the organization computer systems 102a-102n receives a request from a user requesting access to a feature of the system at step 402. The feature may represent information or a function of the organization computer system. The request may represent a request to access information or a request to invoke a function of the organization computer system. As particular examples, the request may represent a request to receive investor information (such as an investor kit), to join an email list, or to receive a webcast. In response to the request, the organization computer system may send a notification to the account/communication management server 108 indicating that the user is attempting to access the account/communication management server 108.

One of the organization computer systems 102a-102n or the account/communication management server 108 determines whether the user must have an account (whether registration is needed) before access to the feature is allowed at step 404. This may include, for example, the account/communication management server 108 or organization computer system determining whether the organization's policies allow free or restricted access to the requested feature.

If no account is needed, the requested feature is provided to the user at step 438. This may include, for example, the organization computer system providing the requested information to the user or executing the requested function on the user's behalf.

Otherwise, at least some form of registration is required before access to the requested feature is allowed. One of the organization computer systems 102a-102n or the account/communication management server 108 determines whether the user is currently involved in an active validated session with the account/communication management server 108 at step 406. The active validated session indicates that the user has already registered and been validated (such as through a password) by the account/communication management server 108. As a particular example, the user may have registered with the account/communication management server 108 and recently provided the user's email address and password to the account/communication management server 108. If there is a current validated session, the requested information or function may be provided to the user at step 438.

If there is no current validated session, one of the organization computer systems 102a-102n or the account/communication management server 108 determines whether the user is using an end user device 106a-106d that currently has access to a validated account cookie at step 408. The validated account cookie contains information that allows the end user device 106a-106d to automatically log in to the account/communication management server 108. The validated account cookie indicates that the user has already registered and was previously validated by the account/communication management server 108. As a particular example, the validated account cookie may contain information such as the user's email address and password. A validated account cookie may be stored in the end user device 106a-106d at any suitable time, such as when the user previously used the end user device 106a-106d to provide the user's email address and password to one of the information computer systems 102a-102n or to the account/communication management server 108.

If a validated account cookie is available, an automatic login is performed at step 410. This may include, for example, the account/communication management server 108 receiving the login information (such as email address and password) from the validated account cookie in the end user device 106a-106d. This may also include the account/communication management server 108 authenticating the user using this information. The requested information or function is then provided to the user at step 438.

If a validated account cookie is not available, one of the organization computer systems 102a-102n or the account/communication management server 108 determines whether the user is using an end user device 106a-106d that currently has access to an email cookie at step 412. The email cookie contains information identifying the user's email address. The email cookie may indicate that the user has previously provided his or her email address to a computer system. An email cookie may be stored in the end user device 106a-106d at any suitable time. For example, an email cookie may be stored in the end user device 106a-106d when the user previously provided his or her email address to one of the information computer systems 102a-102n or to the account/communication management server 108.

If no email cookie is available, one of the organization computer systems 102a-102n or the account/communication management server 108 requests that the user provide his or her email address and receives the email address at step 414. The account/communication management server 108 also performs an MX record lookup at step 416. Up until now, the organization computer systems 102a-102n and the account/communication management server 108 have attempted to use cookies to simplify the authentication process. The use of cookies may reduce or eliminate the need for the user to provide any information during the registration and/or verification process. For example, if an email cookie is available, steps 414-416 may be skipped because the user's email address can be determined without user input.

Once the user's email address is obtained (through a cookie or user input), the account/communication management server 108 compares the email address to the addresses associated with the unique records 120 at step 418. If a matching unique record 120 is not found, the account/communication management server 108 registers the user and creates a new unique record 120 at step 420. The account/communication management server 108 could use, for example, the method 300 of FIG. 3 to register the user.

If a unique record 120 with a matching email address is found or the user has just registered, one of the organization computer systems 102a-102n or the account/communication management server 108 determines whether a validated session is required to access the requested information or function at step 422. This may include, for example, the account/communication management server 108 or organization computer system determining whether an organization's policies require a user to provide his or her password.

If a validated session is not required, one of the organization computer systems 102a-102n or the account/communication management server 108 determines whether a successful MX record lookup is required to access the requested information or function at step 424. This may include, for example, the account/communication management server 108 or organization computer system determining whether an organization's policies require a successful MX record lookup. If not, the requested information or function is provided at step 438.

If a validated session or successful MX record lookup is needed, the account/communication management server 108 determines whether the user's email address has been validated at step 426. This may include, for example, the account/communication management server 108 determining if the unique record 120 associated with the user's email address indicates that the email address has been validated.

If the email address has been validated, the account/communication management server 108 requests the user's password at step 428. This may include, for example, the account/communication management server 108 providing the user with an interface requesting that the user enter his or her password. The account/communication management server 108 then receives and verifies the user's password at step 430. If the user enters an incorrect password, the account/communication management server 108 may give the user one or more additional chances to provide the password. Once the correct password has been received, the user has both registered and been validated. The requested information or function is then provided at step 438.

If the user's email address has not been validated, the account/communication management server 108 sends a validation message containing a validation code to the user's email address at step 432 and receives the code from the user at step 434. This validates the user's email address. Once validated, the account/communication management server 108 asks the user to establish a password associated with the validated email address at step 436. The requested feature is then provided to the user at step 438.

Although FIGS. 4A and 4B illustrate one example of a method 400 for providing requested information or functions to users, various changes may be made to FIGS. 4A and 4B. For example, the account/communication management server 108 could require that the user always provide his or her email address at step 414 and not support the use of cookies. In these embodiments, steps 406-412 could be omitted. Also, the account/communication management server 108 could require that email addresses always be validated, and step 426 could be skipped. Further, while FIGS. 4A and 4B show the use of email addresses as the unique identifier to locate a unique record 120, other identifiers could be received at step 414 and used at step 418. In addition, the method 400 is shown as allowing a user to establish a password at step 436 after the user has validated his or her email address. The user could be allowed to establish a password at any other or additional time.

Figure 5:
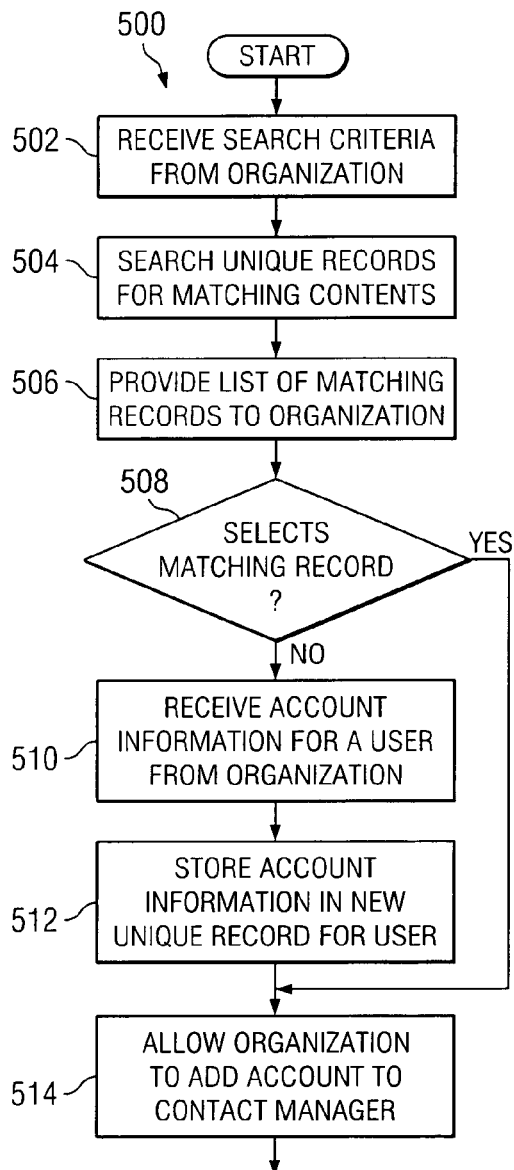
FIG. 5 illustrates an example method for account management according to one embodiment of this disclosure.

FIG. 5 illustrates an example method 500 for account management according to one embodiment of this disclosure. In particular, FIG. 5 illustrates an example method 500 that allows an organization to use the account/communication management server 108 to perform account management for tasks such as investor relations. For ease of explanation, the method 500 is described with respect to the system 100 of FIG. 1. The method 500 could be used in any other suitable system.

The account/communication management server 108 receives one or more search criteria from an organization at step 502. This may include, for example, personnel of the organization providing the search criteria to the account/communication management server 108 using a computing device such as a desktop computer. The search criteria could represent any suitable information, such as a full or partial name, home address, telephone number, or email address of a user of the end user devices 106a-106d.

The account/communication management server 108 searches the unique records 120 to identify any with matching contents at step 504. This may include, for example, the account/communication management server 108 comparing the received search criteria to the contents of the unique records 120. The account/communication management server 108 could attempt to locate exact matches between the search criteria and the contents of the unique records 120 or partial matches. In particular embodiments, an organization may have limited access to the unique records 120, and the account/communication management server 108 may ensure that only the records 120 to which the organization has access are used during the search.

The account/communication management server 108 provides a list of matching unique records 120 (if any) to the organization at step 506. This may include, for example, the account/communication management server 108 providing a list of names from the matching unique records 120 to the organization's personnel.

The account/communication management server 108 determines whether the organization selects one of the identified unique records 120 at step 508. This may include, for example, the account/communication management server 108 determining whether the organization's personnel selects one of the names contained in the list.

If the organization does not select any names in the list, the account/communication management server 108 allows the organization to create a new unique record 120. The account/communication management server 108 receives, from the organization, account information for a user of the end user devices 106a-106d at step 510. The account/communication management server 108 then stores the received account information in a new unique record 120 at step 512.

After a new unique record 120 is created by an organization or an existing unique record 120 is selected by an organization, the organization may add the unique record 120 as a contact in the organization's contact management system 114 at step 514. This may include, for example, the organization's contact management system 114 inserting a reference into a database, where the reference identifies the user's unique record 120 in the database 110. In this way, the user's account information is available to the organization. Moreover, as the user's account information changes, the organization has access to the updated information.

Although FIG. 5 illustrates one example of a method 500 for account management, various changes may be made to FIG. 5. For example, an organization may be limited to searching existing unique records 120 and not allowed to create new unique records 120. Also, an organization may be allowed to search only a subset of the unique records 120.

Figure 6:
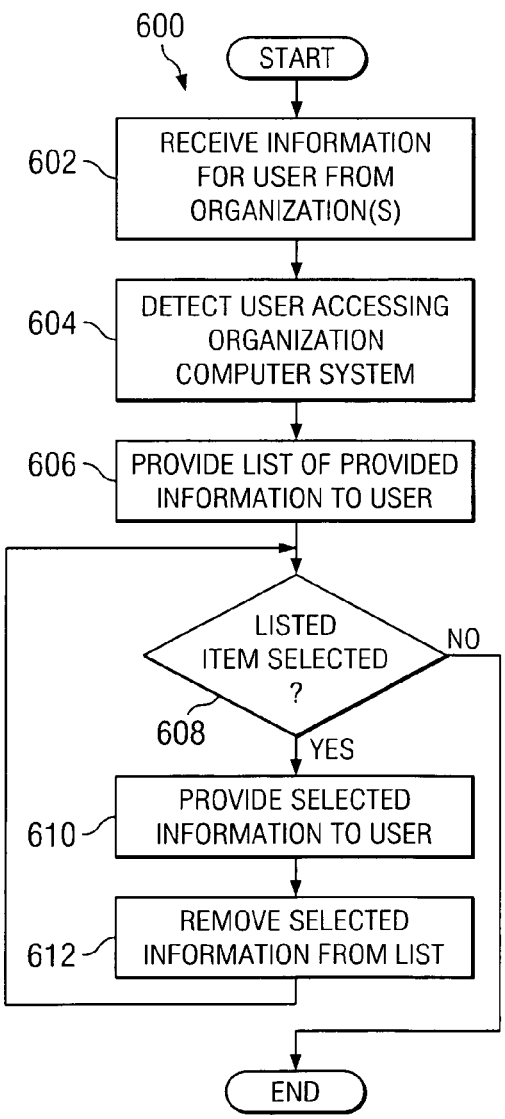
FIG. 6 illustrates an example method for facilitating communication between users and organizations according to one embodiment of this disclosure.

FIG. 6 illustrates an example method 600 for facilitating communication between users and organizations according to one embodiment of this disclosure. For ease of explanation, the method 600 is described with respect to the account/communication management server 108 operating in the system 100 of FIG. 1. The method 600 could be used by any other suitable device and in any other suitable system.

The account/communication management server 108 receives information for a user from one or multiple organizations at step 602. This may include, for example, the account/communication management server 108 receiving information, URLs for accessing information, or any other or additional content from one or more of the organization computer systems 102a-102n. The received information could represent any suitable content, such as news items, file downloads, updated websites, or any other or additional content.

The account/communication management server 108 detects the user accessing one of the organization computer systems 102a-102n at step 604. This may include, for example, the account/communication management server 108 receiving an indication from one of the organization computer systems 102a-102n that the user has provided an email address and password to the computer system. This may also include the account/communication management server 108 validating the user's email address and password.

The account/communication management server 108 provides to the user a list of information that has been received from the organizations at step 606. This may include, for example, the account/communication management server 108 providing a list of URLs or other links to the information from the organizations.

The account/communication management server 108 determines if the user selects information from the list at step 608. This may include, for example, the account/communication management server 108 determining if the user has selected a link in the list provided to the user. If so, the selected information is provided to the user at step 610, and the selected information is removed from the list at step 612.

In this way, multiple organizations are capable of providing information to a user. Moreover, information from multiple organizations may be provided to the user when the user accesses a single one of the organization computer systems 102a-102n. As a particular example, the user could represent an investor, and the organizations could represent corporations and other businesses in which the investor may choose to invest. Each of the organizations could provide the user with an offer to purchase stock, a proxy solicitation, or an offer to participate in a direct reinvestment program. This communication capability may actually allow the account/communication management server 108 to act as a new type of stock exchange, facilitating the flow of information from businesses to investors and business-to-investor e-commerce.

The account/communication management server 108 facilitates communication between the organization computer systems 102a-102n and the users by allowing multiple organizations to provide information to the users. The users may access this information using the links provided by the account/communication management server 108, and the links may provide access to the information maintained by the organization computer systems 102a-102n. Moreover, the users may access information provided by multiple organizations whenever the users access a single one of the organization computer systems 102a-102n. As a result, the account/communication management server 108 acts as a mechanism for conjoining the organization computer systems 102a-102n so that a user may easily access information in each of the computer systems whenever a single computer system is accessed.

Although FIG. 6 illustrates one example of a method 600 for facilitating communication between users and organizations, various changes may be made to FIG. 6. For example, the list of information could also be provided to the user when the user accesses the account/communication management server 108.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
receiving, at a communication manager that manages information for a plurality of users, information from at least a first one of a plurality of computer systems for delivery to a user within the plurality of users, wherein the user is authorized to access each of the plurality of computer systems, wherein the communication manager is implemented as a computer hardware apparatus;
receiving, at the communication manager, account registration information about the user from a second one of the computer systems;
detecting, at the communication manager, that the user is accessing a third one of the computer systems or the communication manager;
in response to detecting the user accessing the third computer system or the communication manager, determining if the account registration information about the user is complete; and
providing the information from at least the first computer system to the user only if the account registration information about the user is complete,
wherein the first, second and third computer systems are associated with different business entities, and wherein the information from at least the first computer system comprises a text item and a link to online content associated with investment information from at least one of the different business entities.

2. The method of claim 1, wherein:
the user comprises an investor; and
the plurality of computer systems are associated with a plurality of businesses.

3. The method of claim 1, wherein the information provided to the user further comprises at least one of: a downloadable file and a website.

4. The method of claim 1, wherein the information provided to the user comprises at least one of: an offer to purchase stock, a proxy solicitation, and an offer to participate in a direct reinvestment program.

5. The method of claim 1, wherein detecting that the user is accessing the third computer system comprises receiving an indication from the third computer system that the user is accessing the third computer system;
and further comprising, before providing the information, at least one of: registering the user with the communication manager, validating an electronic mail ("email") address associated with the user, performing a mail exchange record lookup using the email address associated with the user, and verifying a password associated with the user.

6. The method of claim 1, wherein providing the information to the user comprises:
providing the user with a list of items representing the information; and
receiving a selection of at least one item in the list from the user.

7. The method of claim 6, further comprising removing at least one item from the list in response to the user selecting the item and reviewing the associated information.

8. An apparatus, comprising:
a memory operable to store information from at least a first one of a plurality of computer systems for delivery to a user within a plurality of users, wherein the user is authorized to access each of the plurality of computer systems; and
one or more processors located within the apparatus, where the one or more processors are collectively operable to:
receive account registration information about the user from a second one of the computer systems;
detect a user accessing a third one of the computer systems;
in response to detecting the user accessing the third computer system, determine if the account registration information about the user is complete; and
provide the information from at least the first computer system to the user only if the account registration information about the user is complete,
wherein the first, second and third computer systems are associated with different business entities, and wherein the information from at least the first computer system comprises a text item and a link to online content associated with investment information from at least one of the different business entities.

9. The apparatus of claim 8, wherein:
the user comprises an investor; and
the plurality of computer systems are associated with a plurality of businesses.

10. The apparatus of claim 8, wherein the information provided to the user further comprises at least one of: a downloadable file and a website.

11. The apparatus of claim 8, wherein the information provided to the user comprises at least one of: an offer to purchase stock, a proxy solicitation, and an offer to participate in a direct reinvestment program.

12. The apparatus of claim 8, wherein:
the one or more processors are collectively operable to detect that the user is accessing one of the computer systems by receiving an indication from the accessed computer system that the user is accessing the accessed computer system; and
the one or more processors are further collectively operable to, before providing the information, at least one of: register the user with the communication manager, validate an electronic mail ("email") address associated with the user, perform a mail exchange record lookup using the email address associated with the user, and verify a password associated with the user.

13. The apparatus of claim 8, wherein the one or more processors are collectively operable to provide the information to the user by:
providing the user with a list of items representing the information; and
receiving a selection of at least one item in the list from the user.

14. The apparatus of claim 13, wherein the one or more processors are further collectively operable to remove at least one item from the list in response to the user selecting the item and reviewing the associated information.

15. A computer program product tangibly embodied on a computer readable storage medium, the computer program product comprising computer readable program code for:
receiving, at a communication manager that manages information for a plurality of users, information from at least a first one of a plurality of computer systems for delivery to a user within the plurality of users, wherein the user is authorized to access each of the plurality of computer systems;
receiving, at the communication manager, account registration information about the user from a second one of the computer systems;
detecting that the user is accessing a third one of the computer systems or the communication manager;
in response to detecting the user accessing the third computer system or the communication manager, determining if the account registration information about the user is complete; and
providing the information from at least the first computer system to the user only if the account registration information about the user is complete,
wherein the first, second and third computer systems are associated with different business entities, and wherein the information from at least the first computer system comprises a text item and a link to online content associated with investment information from at least one of the different business entities.

16. The computer program product of claim 15, wherein:
the user comprises an investor; and
the plurality of computer systems are associated with a plurality of businesses.

17. The computer program product of claim 15, wherein the information provided to the user further comprises at least one of: a downloadable file and a website.

18. The computer program product of claim 15, provided to the user comprises at least one of: an offer to purchase stock, a proxy solicitation, and an offer to participate in a direct reinvestment program.

19. The computer program product of claim 15, wherein the computer readable program code for detecting that the user is accessing the third computer system comprises computer readable program code for receiving an indication from the third computer system that the user is accessing the third computer system; and
further comprising computer readable program code for, before providing the information, at least one of: registering the user with the communication manager, validating an electronic mail ("email") address associated with the user, performing a mail exchange record lookup using the email address associated with the user, and verifying a password associated with the user.

20. The computer program product of claim 15, wherein the computer readable program code for providing the information to the user comprises computer readable program code for:
providing the user with a list of items representing the information; and
receiving a selection of at least one item in the list from the user.

21. The computer program product of claim 20, further comprising computer readable program code for removing at least one item from the list in response to the user selecting the item and reviewing the associated information.

22. A method, comprising:
- detecting at a first one of a plurality of computer systems that one user of a plurality of users is accessing the first computer system, wherein each user of the plurality of users is capable of accessing each of the plurality of computer systems;
- providing an indication identifying the user that is accessing the computer system to a communication manager that manages information for a plurality of users;
- receiving from the communication manager an access approval for the user, wherein the access approval is received only if account registration information about the user from a second one of the computer systems is complete;
- receiving information for delivery to the user from at least a third one of the plurality of computer systems; and
- after receiving the information and access approval, and in response to detecting that the user is accessing the computer system, providing the content information to the user,
- wherein the first, second and third computer systems are associated with different business entities, and wherein the content information comprises a text item and a link to online content associated with investment information from at least one of the different business entities.

23. The method of claim 1, wherein the information provided to the user originates from more than one of the computer systems.

24. The method of claim 1, wherein the user is authorized to access each of the plurality of computer systems although the user does not have an account.

25. The method of claim 1, wherein the user is authorized to access each of the plurality of computer systems only if the user has an account.

26. The method of claim 1, wherein the user is authorized to access each of the plurality of computer systems only if the user has an account and the user is using an end user device that currently has access to a validated account cookie.

\* \* \* \* \*